United States Patent [19]

Ernst

[11] 3,909,445

[45] Sept. 30, 1975

[54] METHOD FOR REDUCING FOAM IN WATER CONTAINING SYSTEMS

[75] Inventor: Franz J. M. Ernst, Wedel, Schleswig-Holstein, Germany

[73] Assignee: Mobil Oil Corporation, New York, N.Y.

[22] Filed: Sept. 21, 1972

[21] Appl. No.: 290,912

Related U.S. Application Data

[63] Continuation-in-part of Ser. No. 20,861, March 18, 1970, abandoned.

[52] U.S. Cl. ............... 252/321; 252/308; 252/314; 252/358
[51] Int. Cl.² ......................................... B01D 19/04
[58] Field of Search ............ 252/9, 56 R, 56 S, 308, 252/321, 358

[56] References Cited
UNITED STATES PATENTS

| | | | |
|---|---|---|---|
| 2,298,465 | 10/1942 | Clapsadle | 252/321 X |
| 2,384,848 | 9/1945 | Peters | 260/33.6 PQ |
| 2,558,053 | 6/1951 | Lee | 260/33.6 PQ UX |
| 2,753,309 | 7/1956 | Figdor | 252/321 X |
| 2,820,699 | 1/1958 | Morris | 252/321 X |
| 2,903,432 | 9/1959 | Hwa | 252/321 |
| 3,238,142 | 3/1966 | Perry | 252/321 X |
| 3,523,916 | 8/1970 | Needham et al. | 260/33.6 PQ X |
| 3,705,859 | 12/1972 | Boylan | 252/321 |

*Primary Examiner*—Richard D. Lovering
*Attorney, Agent, or Firm*—Charles A. Huggett; Raymond W. Barclay; Claude E. Setliff

[57] ABSTRACT

The invention provides a method for reducing foam in water containing systems by using a low-molecular weight polyethylene dispersed in a vehicle containing, for example, a mineral oil or fatty material and an emulsifier. The dispersion of polyethylene is produced by heating the polyethylene in a vehicle, such as mineral oil, to dissolve said polyethylene in said vehicle, and cooling the resulting solution to at least 60°C. such that the cooling rate is never less than 4°C. per minute nor more than about 20°C. per minute.

16 Claims, No Drawings

1

METHOD FOR REDUCING FOAM IN WATER CONTAINING SYSTEMS

CROSS-REFERENCE TO RELATED APPLICATIONS

This application is a continuation-in-part of U.S. application Ser. No. 20,861, filed Mar. 18, 1970, and now abandoned.

BACKGROUND OF THE INVENTION

1. Field of the Invention

The invention relates to defoaming of water containing systems. In particular, it relates to defoaming with compositions comprising a low-molecular weight polyethylene finely dispersed in a suitable vehicle.

2. Description of the Prior Art

U.S. Pat. No. 3,336,223 relates to an improved means for prolonging the useful life of an additive-containing lubricating oil. This is accomplished, as taught by the patentee, by incorporating the additive into a solid thermoplastic polymer and depositing this composition in the oil. Typical of the useful polymers are an ethylene-propylene copolymer having a molecular weight ranging from 200,000 to 300,000 and polyisobutylene ranging in molecular weight from 81,000 to 135,000.

In another patent, U.S. Pat. No. 3,340,194, a rolling oil is provided by blending a straight distillate mineral oil with atactic polypropylene at a temperature in the range of 120°–200°F.

Other patents, such as U.S. Pat. Nos. 2,384,848, 2,558,053, 3,563,055 and 2,313,144 generally teach dissolving polyethylene in solvents. However, none of these, nor those just mentioned, are concerned with the use of such polyethylene compositions as defoamants. U.S. Pat. No. 2,820,699 discloses the use of polyethylene per se as a defoamant for Kjeldahl nitrogen determinations, but it will be demonstrated that such disclosure does not suggest polyethylene dispersed in a vehicle is a defoamant.

SUMMARY OF THE INVENTION

In accordance with the invention, there is provided a method for defoaming water-containing systems comprising adding thereto a polyethylene having a molecular weight of from about 500 to about 25,000 dispersed in a vehicle therefor, the composition being prepared by the steps of heating said vehicle and said polyethylene at a temperature sufficient to cause dissolution of said polyethylene and cooling the resulting material at a rate to provide a stable dispersion of said polyethylene of desirable particle sizes in said vehicle.

To facilitate application of the said composition to aqueous systems, an emulsifier, preferably a non-ionic one, may be present therein if the vehicle is not water soluble or emulsifiable by itself.

DISCUSSION OF SPECIFIC EMBODIMENTS

In preparing the composition, the vehicle or the vehicle and the emulsifier are heated to a temperature which is sufficiently high to dissolve the polyethylene. This temperature may range from about 90°C. to about 150°C., preferably from about 100°C to 120°C. The polyethylene is then added and the mixture stirred at the dissolution temperature until dissolved.

All of the vehicle may be added initially, but preferably from 20–25% of the total is used to dissolve the polyethylene, with the remainder being added after dissolution. The temperature of the additional vehicle may be the same as the initial body of materials, or it may be at a lower temperature. In the latter event, addition of the vehicle serves as the means for attaining the rate of cooling to prevent formation of polyethylene particles of undesirable size, to be discussed below.

As is evident from the above discussion, the polyethylene is present in the composition in the form of a fine dispersion. Polyethylene in this state is necessary, since apparently the effectiveness of the composition decreases the more coarse the polyethylene particles therein are.

In addition to the requirement that polyethylene be in the finely dispersed state, it is believed that the size of the particles of polyethylene in the dispersion must be within a definite range, probably in the range of 0.1 micrometer. However, since the particle size is so small, recovery of defoamant and measurement of the sizes of the polyethylene particles have not been feasible. Without any intention of being bound thereby, it is probable however, that the desired particle size is in the range of thickness of the liquid film present in the foam being acted upon.

Polyethylene dispersions having the desired physical features are obtained by controlled cooling of the hot polyethylene solution, containing or not containing an emulsifier to at least a temperature at which the polyethylene particles have solidified sufficiently. This will usually be at least 60°C. The time within which such cooling must be accomplished will vary, depending upon the type of polyethylene and vehicle being used, but it has been determined that the cooling rate can be too rapid or too slow, producing polyethylene particles in the composition which are ineffective (see Example 1), probably because they are too small or too large, respectively, in size.

To produce compositions which are effective defoamants, the solution must be cooled at such a rate that no part of the cycle to a temperature of 60°C is less than about 4°C nor more than about 20°C per minute, preferably at from about 8°C to about 20°C per minute. In accomplishing this cooling rate, external cooling means may be used, or cooling may be as indicated earlier. That is, the major portion of vehicle may be added at storage temperature to a solution prepared from the polyethylene (or polyethylene plus emulsifier) and a minor portion of the total required vehicle at such a rate as to give the cooling rate desired.

The vehicle employed may vary widely in chemical nature depending upon its compatibility with the system to which the defoaming composition is to be applied. In any case the vehicle must display an at least moderate solubility towards the polyethylene at manufacturing temperature and a very low or no solubility at application temperature. Usable are, for example, hydrocarbons, mineral oils, fatty oils, fatty acids, fatty acid esters and emulsifiers. Included among these substances are the naphthenic and paraffinic mineral oils, rapeseed oil, butyl stearate, tall oil, tetraisobutylene, sodium petrol sulphonate, and the like.

The emulsifier used can be of any type but has to be compatible with the system to which the defoamant is to be applied. Non-ionics are preferable as they are the most harmless and least sensitive ones, as for example, Genapol X050 or Marlophen 85, the chemical structures of which are given as

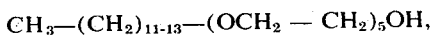

and

respectively.

As has been stated previously, the polyethylenes useful in this invention may have molecular weights between about 500 and 25,000. Copolymeric polyethylenes are useful too. While no limitation is to be inferred therefrom, the preferred polyethylene will be in pellet form. Obviously, polyethylene in other forms may be used, the stated preference resulting merely from the fact that pelletized polyethylene is convenient both from the standpoint of ease of handling and of ease of dissolution.

The concentration of polyethylene in the vehicle when preparing the dispersion can range from about 0.5% to about 15% by weight. When using this dispersion as component of an emulsifiable oil to obtain emulsions thereof of reduced foaming tendency, the emulsifiable oil should contain from about 0.05 to about 20% by weight of the dispersion. When either is used as an additive to reduce foaming in an aqueous medium, a sufficient amount should be employed to give a polyethylene concentration in the aqueous medium of from about 0.0002 to about 0.1% by weight.

Having described the invention in general terms, the following Examples illustrate the specific practice of the invention. It will be understood that no limitation on the scope of the invention is intended by the illustration. Parts are by weight unless otherwise stated.

EXAMPLE 1

Manufacture of Compositions with Different Rates of Cooling and Agitating 188 g acid refined naphthenic mineral oil (25 cs at 100°F.) and 12 g polyethylene A (for properties see Example 2) were stirred in a 400 ml glass beaker at 110°C. until all dissolved. Cooling was done three different ways, each time using newly prepared blends:

a. The hot beaker was kept quiet at ambient temperature for 24 hours. A cloudy slightly jelly-like oil resulted.
b. The hot beaker was put in a trough through which cold tap water was running fast. At same time the blend was agitated intensively by means of a usual laboratory stirrer at about 500 rpm. A jelly-like oil resulted.
c. The hot beaker was put in a trough filled with water of 20°C. and the blend was stirred smoothly by moving a glass rod along the beaker walls at about 20 rounds per minute, until the contents had reached 25°C. A soft jelly resulted.

Only Blend (c) was found effective as described under Example 9.

In experiments to determine relative cooling rates, 1(a)–(c) was repeated, except the times may have varied, with the following results:

| Example | Temperature °C | Difference | Time Minutes | Difference | Cooling Speed °C/Min. |
|---|---|---|---|---|---|
| 1(a) | 108 | | 3 | | |
| | 102 | 6 | 5 | 2 | 3 |
| | 85 | | 13 | | |
| | 81 | 4 | 15 | 2 | 2 |

-Continued

| Example | Temperature °C | Difference | Time Minutes | Difference | Cooling Speed °C/Min. |
|---|---|---|---|---|---|
| | 63 | | 33 | | |
| | 59 | 4 | 38 | 5 | 0.8 |
| 1(b) | 90 | | 44[1] | | |
| | 85 | 5 | 52[1] | 8 | 38 |
| | 70 | | 95[1] | | |
| | 65 | 5 | 112[1] | 27 | 11 |
| | 50 | | 237[1] | | |
| | 45 | 5 | 282[1] | 45 | 6.7 |
| 1(c) | 104 | | 0.5 | | |
| | 99 | 5 | 0.75 | 0.25 | 20 |
| | 80 | | 2.0 | | |
| | 78 | 2 | 2.25 | .25 | 8 |
| | 67 | | 3.5 | | |
| | 65 | 2 | 4.0 | 0.5 | 4 |
| | 55 | | 6.0 | | |
| | 52 | 3 | 7.0 | 1.0 | 3 |

[1]Seconds.

It is evident that defoamant activity is dependent on a dispersion formed at a definite rate of cooling and agitating. The products obtained at the different rates are therefore different. Applicant does not know what the product is in terms of its precise structure and can only describe it in accordance with the steps used to make it.

EXAMPLE 2

Manufacture of Compositions with Rape Seed Oil as Vehicle and Different Polyethylenes 47 parts of rape seed oil and 3 parts of polyethylene A, B, or C were stirred and heated up to 115°C. resulting in clear solutions. Heating was discontinued, stirring continued, and 50 parts of rape seed oil at 30°C. were continuously poured into the beaker within about 5 minutes, which made the temperature drop to about 70°C. Stirring was continued until the temperature had dropped to about 30°C. Cloudy, somewhat jelly-like oils resulted.

| Properties of polyethylenes: | A | B | C |
|---|---|---|---|
| Molecular Weight, Average | 2.000 | 3.500 | 10.000 |
| Density at 20°C., g/ml | 0.92 | 0.92 | 0.92 |
| Melting Temperature, °C. | 104–108 | 93 | 104–106 |
| Viscosity at 140°C, cp | 180 | 570 | ca.3.000 |
| Polyethylene B is a copolymer. | | | |

EXAMPLE 3

Manufacture of a Composition with a Fatty Acid Ester as Vehicle

The composition was made like that in Example 2 with Polyethylene A, replacing rape seed oil by butyl stearate. A cloudy, soft jelly resulted.

EXAMPLE 4

Manufacture of a Composition with Carboxylic Acids as Vehicle

The composition was made like that in Example 2 with Polyethylene A, replacing rape seed oil by distilled tall oil. A very soft jelly resulted.

EXAMPLE 5
Manufacture of a Composition with a Hydrocarbon as Vehicle

The composition was made like that in Example 2 with Polyethylene A, replacing rape seed oil by tetraisobutylene. A soft jelly resulted.

EXAMPLE 6
Manufacture of a Composition with an Anionic Emulsifier as Vehicle The composition was prepared like that in Example 2 with Polyethylene A, replacing rape seed oil by a sodium petrol sulphonate of a type as used in emulsifiable metal cutting fluids. A cloudy, somewhat jelly-like mixture resulted.

EXAMPLE 7
Manufacture of a Composition with a Non-Ionic Emulsifier as Vehicle The composition was prepared like that in Example 2 with Polyethylene A, replacing rape seed oil by an emulsifier made by condensing one mole lauryl-alcohol with 5 moles ethylene oxide (Note: Genapol X050). On heating up, the mixture remained cloudy at 120°C. Apparently the polyethylene did not dissolve completely. A cloudy oil resulted which obviously contained relatively coarse solid particles.

EXAMPLE 8
Manufacture of a Composition with Mineral Oil as Vehicle and an Emulsifier 20 parts of acid refined naphthenic mineral oil (25 cs at 100°F.) and 10 parts of Genapol X050 were stirred together in a suitable reactor and heated by means of an immersion heater to 110°C. 3 parts of polyethylene A (for properties see Example 2) were added and the mixture was stirred at 110°C until dissolution was effected. Heating was discontinued, and 67 parts of the mineral oil at about 15°C. were added in a steady stream over a period of 10–15 minutes, at which point the temperature had dropped to about 55°C. This corresponds to a cooling rate of between 5.5 and 3.7°C. per minute. Stirring was then continued until the temperature reached 25°C. A very cloudy, slightly jelly-like oil resulted. This oil had the following properties:

| | |
|---|---|
| Density at 15°C. | 0.91 g/ml |
| Flash point | 190°C. |
| Neutralization No. | 0.1 mg KOH/gm |
| Visc. at 20°C. | ca 350 cs. |
| at 37.8°C. | ca 75 cs. |
| at 50°C. | ca 32 cs. |

The oil is easily emulsifiable with water, but the emulsion is unstable, about 60% of the oil separating after about 30 minutes. The defoaming activity of the oil is described in Examples 9–14.

EXAMPLE 9
Evaluation of the Products of Examples 1–8

The products of Examples 1–8 were tested to determine their defoaming action in the following way:

Mixtures of 95% of emulsifiable oil and 5% of the products under test were stirred for 30 minutes at 50°C. Five parts of this were mixed with 95 parts of distilled water and tested for foaming tendency.

The foam test was run by placing 100 ml of the aqueous liquid under test into a one liter glass bottle, stopping same and shaking vigorously for 15 seconds. Foam heights were measured after varying times. The results are shown in Table 1.

Table 1

Foam Tests with Emulsions Prepared of Mixtures of Emulsifiable Oil A* with Defoaming Compositions

| Defoaming Composition | Foam Height, In mm. After 5 Seconds |
|---|---|
| Emulsifiable Oil A without a Defoaming Composition | 85 |
| of Example 1 a | 85 |
| of Example 1 b | 85 |
| of Example 1 c | 5 |
| of Example 2 A | 10 |
| of Example 2 B | 12 |
| of Example 2 C | Traces of Foam |
| of Example 3 | Traces of Foam |
| of Example 4 | 12 |
| of Example 5 | Traces of Foam |
| of Example 6 | 14 |
| of Example 7 | 20 |
| of Example 8 | 8 |

*See footnote to Table 2.

EXAMPLE 10
Evaluation of the Product of Example 8, Incorporated in Several Emulsifiable Oils Mixtures of 95% of the emulsifiable oils shown in Table 2 and 5% of Product of Example 8 were stirred for 30 minutes at 50°C. Five parts of this were mixed with 95 parts of 90 ppm hard water and foam tested as described under Example 9. The results are shown in Table 2.

Table 2

Foam Tests with Emulsions Prepared of Mixtures of Emulsifiable Oils with Product of Example 8

| Emulsifiable Oil* | Foam Heights, In mm, After 5 seconds | |
|---|---|---|
| | Without Product of Example 8 | With Product of Example 8 |
| A | 60 | 2 |
| B | 60 | 0 |
| C | 42 | 0 |
| D | 35 | 8 |
| E | 22 | 0 |
| F | 50 | 4 |
| G | 44 | 5 |
| H | 12 | 0 |

*A - contains about 70% naphthenic stock besides anionic and non-ionic emulsifiers.
B - contains about 60% naphthenic stock besides anionic and non-ionic emulsifiers.
C - contains about 75% naphthenic stock besides anionic emulsifiers.
D - contains about 81% naphthenic stock besides non-ionic emulsifiers.
E - contains about 77% naphthenic stock besides anionic emulsifiers and minor amounts of non-ionic emulsifiers.
F - contains about 73% naphthenic stock besides anionic emulsifiers.
G - contains about 74% naphthenic stock and 5% fatty material besides anionic and non-ionic emulsifiers.
H - contains about 60% naphthenic stock and 20% fatty material besides anionic and non-ionic emulsifiers.

EXAMPLE 11
Evaluation of the Product of Example 8 by Addition to Emulsions Foam tests were carried out as described under Example 9 with several 5% emulsions prepared in 90 ppm hard water, without and with Product of Example 8 added. The results are given in Table 3.

Table 3

Foam Tests with Emulsions after Addition of Product of Example 8

| 5% Emulsions of Emulsifiable Oil* | Foam Heights, in mm | | | |
|---|---|---|---|---|
| | without addition | | with 0.15% added | |
| | after 5 sec | after 10 min | after 5 sec | after 10 min |
| A | 60 | 50 | 12 | 2 |
| B | 60 | 40 | 12 | 7 |
| C | 42 | 8 | 0 | 0 |
| D | 35 | 28 | 8 | 5 |
| E | 22 | 9 | 0 | 0 |
| F | 50 | 2 | 9 | 2 |
| G | 44 | 36 | 6 | 2 |

*See Table 2 for definition of the oils.

EXAMPLE 12

Evaluation of Product of Example 8 by Prolonged Agitation with Air

5% emulsions were prepared in 90 ppm hard water of Emulsifiable Oil B and of a mixture of 95% Emulsifiable Oil B and 5% Product of Example 8 which had been stirred at 50°C. for half an hour. 5 liter of each emulsion were placed separately into a 20 liter pail. Air was bubbled through at a rate of 20 liter per minute by means of a glass tube.

a. without Product of Example 8:
After 1 hour foam was creeping out of the pail.
When air bubbling was stopped after 2 days, foam heights were 250 mm 5 seconds later, and 5 mm 10 minutes later, respectively.

b. with Product of Example 8:
After 1 hour foam height was about 100 mm. When air bubbling was stopped after 2 days, foam heights were 20 mm 5 seconds later, and 0 mm 20 seconds later, respectively.

EXAMPLE 13

Evaluation of Product of Example 8 in Paraffin Wax Emulsions

Foam tests were carried out in accordance with ASTM D 892 at 24°C. (190 ml emulsion in a 1,000 ml glass cylinder, air being introduced by means of a diffuser stone, about 100 ml per min., for 5 minutes). Product of Example 8 was added to the emulsions in the cylinder and distributed by gentle stirring. Tests were run with freshly prepared mixtures and those stored at 25°C. for 10 days. Results are given in Table 4.

Table 4

ASTM-Foam Tests with Paraffin Wax Emulsions

| Wax Emulsion* | % Example 8 Product added | Volume of Foam, in ml | | |
|---|---|---|---|---|
| | | Just after 5 min. air introducing | 10 min later | 45 min later |
| A | 0.0 | 510 | 480 | 450 |
| A, fresh | 0.1 | 490 | 130 | 25 |
| A, 10 days | 0.1 | 420 | 0 | |
| A, fresh | 0.5 | 400 | 60 | 1 ml after 15 min. |
| A, 10 days | 0.5 | 300 | 0 | |
| B | 0.0 | 530 | 500 | 200 |
| B, fresh | 0.3 | 450 | 80 | 0 ml after 20 min. |
| B, 10 days | 0.3 | 400 | 30 | 0 ml after 15 min. |
| C | 0.0 | 540 | 500 | 400 |
| C, fresh | 0.3 | 450 | 80 | 0 ml after 20 min. |
| C, 10 days | 0.3 | 400 | 30 | 0 ml after 15 min. |
| D | 0.5 | 690 | 630 | 0 ml upon revolving the cylinder gently several times |
| D but 0.04% silicon emulsion added | 0.0 | 760 | 660 | 400 ml upon revolving the cylinder gently several times |

*A - contains 46% paraffin wax unbleached and about 51% water.
B - contains 55% of slack wax and about 40% of water.
C - contains about 20% of each of paraffin wax unbleached, crude scale wax, and slack wax and about 35% water.
D - contains 54% of paraffin wax unbleached and about 36% water.

EXAMPLE 14

The efficiency of Product of Example 8 was tested in a glue mixture consisting of 100 parts of urea-formaldehyde glue, 10 parts of Wax Emulsion D, 23 parts of water and 10 parts of hardener solution (17% ammonium chloride, 20% conc. ammonia solution, 63% water). 250 g of the glue mixture were put in a 600 ml glass beaker (filled 45 mm in height). Air was introduced into the mixture as in ASTM D 892 Foam Test, but only for 1 minute, and foam height measured. Foam heights were again measured after gentle stirring (1 round only) and after revolving the cylinder gently several times. With 0.5% of the product of Example 8, the foam height after introduction of air, after one round of stirring and after revolving was 45 mm, 5 mm and 0 mm, respectively. With no additive, the foam heights were 45 mm, 25 mm and 15 mm, respectively.

EXAMPLE 15

Evaluation of Product of Example 8 in a Clearly Water Soluble Chemical Coolant for Metal Machining Foam tests were carried out as described under Example 9 with 5% dilutions of the coolant* in distilled water and foam height measured after 5 seconds.

*Contains about 54% water, about 30% of pure triethanolamine and about 5% of a water soluble polyoxyalkylene polyol.

a. without addition: 15 mm foam
b. with addition of 1% Product of Example 8 to the coolant prior to diluting: traces of foam
c. 30 mg Product of Example 8 added to 100 ml of dilution: traces of foam

EXAMPLE 16

Evaluation of Product of Example 2 C in a Dish Washing Liquid

1% of Product of Example 2 C was mixed with 99% of a common dish washing liquid. Foam tests were carried out as described under Example 9 with 1% dilutions of the liquid unchanged and of the mixture and foam heights measured after 5 seconds.

a. without Product of Example 2 C: flask filled with foam
b. with Product of Example 2 C: 50 mm foam.

While the present invention has been described in considerable detail in connection with a few specific embodiments for specific purposes, it is apparent that novel compositions of this invention are not restricted to such embodiments and details for there are many obvious modifications and variations which enhance their wide application in various types of utilization. Accordingly, the present invention should not be construed as limited in any particulars except as may be recited in the appended claims or required by the prior art.

I claim:

1. In a method for defoaming a system consisting essentially of water and an emulsifiable natural or synthetic oil, a wax, a glue or a detergent, the improvement whereby there is added to said system a polyethylene having a molecular weight of from about 500 to about 25,000, said polyethylene having been dissolved by heating in a vehicle selected from the group consisting of tetraisobutylene, mineral oils, fatty oils, fatty acids, emulsifiers selected from the group consisting of sodium petrol sulfonate, $CH_3-(CH_2)_{11-13}-(OCH_2-CH_2)_5OH$, $C_9H_{19}-C_6H_4-(OCH_2-CH_2)_5OH$ and mixtures thereof and the resulting solution cooled to at least 60°C such that the cooling rate is never less than about 4°C per minute nor more than about 20°C per minute, the resulting dispersion of polyethylene and vehicle containing from about 0.5 to about 15% of polyethylene and being added to said system in sufficient amount to provide from about 0.0002 to about 0.1% by weight of polyethylene therein.

2. The method of claim 1 wherein the vehicle is a mineral oil.

3. The method of claim 1 wherein the vehicle is a fatty material.

4. The method of claim 1 wherein the vehicle is an emulsifier alone or in admixture with mineral oil or fatty material.

5. The method of claim 1 wherein the temperature is from about 90°C to about 150°C.

6. The method of claim 5 wherein the temperature is from about 90°C to about 120°C.

7. The method of claim 1 wherein the rate of cooling is not less than 8°C per minute.

8. The method of claim 1 wherein the system is an aqueous emulsion system.

9. The method of claim 1 wherein the vehicle is rapeseed oil.

10. The method of claim 1 wherein the vehicle is butyl stearate.

11. The method of claim 1 wherein the vehicle is tall oil.

12. The method of claim 1 wherein the vehicle is tetraisobutylene.

13. The method of claim 1 wherein the polyethylene has a molecular weight of 2,000.

14. The method of claim 4 wherein the emulsifier is an alkylethoxylate.

15. The method of claim 14 wherein the alkylethoxylate has from about 12 to about 14 carbon atoms in the alkyl portion and about 5 ethoxyls.

16. The method of claim 1 wherein the vehicle comprises a mixture of mineral oil and an alkylethoxylate emulsifier, and wherein the polyethylene has an average molecular weight of 2,000.

* * * * *

UNITED STATES PATENT AND TRADEMARK OFFICE
CERTIFICATE OF CORRECTION

PATENT NO. : 3,909,445
DATED : September 30, 1975
INVENTOR(S) : Franz J. M. Ernst It is certified that error appears in the above-identified patent and that said Letters Patent are hereby corrected as shown below:

Column 4, line 8 (column 4 of the table) "$112^{(1)}$" should be --$122^{(1)}$--

Column 8, line 16    "1,000m" should be --1,000 ml--.

Signed and Sealed this twenty-third Day of March 1976

[SEAL]

Attest:

RUTH C. MASON
*Attesting Officer*

C. MARSHALL DANN
*Commissioner of Patents and Trademarks*